(No Model.)
M. M. WARMOTH.
CULTIVATOR.
No. 290,376. Patented Dec. 18, 1883.
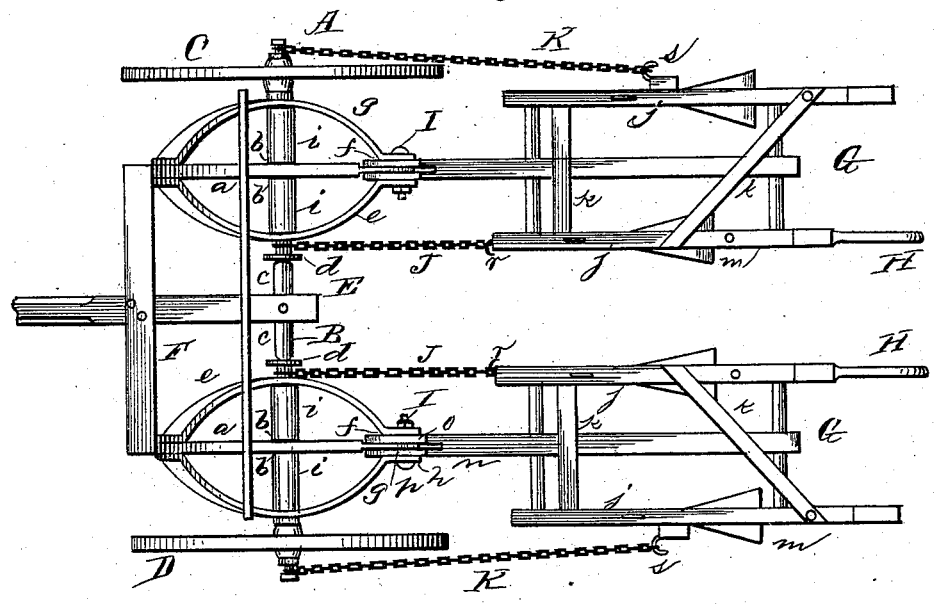
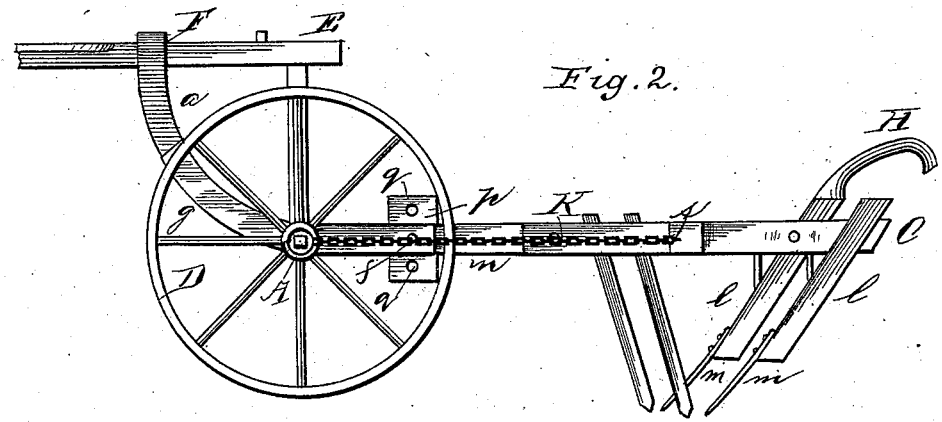
Witnesses:
L. C. Hills
H. Johnson
Inventor:
Madison M. Warmoth
Attorney

UNITED STATES PATENT OFFICE.

MADISON MONROE WARMOTH, OF BRANDENBURG, KENTUCKY.

CULTIVATOR.

SPECIFICATION forming part of Letters Patent No. 290,376, dated December 18, 1883.

Application filed October 13, 1883. (No model.)

*To all whom it may concern:*

Be it known that I, MADISON M. WARMOTH, a citizen of the United States of America, residing at Brandenburg, in the county of Meade and State of Kentucky, have invented certain new and useful Improvements in Cultivators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to cultivators; and it consists in the improved construction hereinafter fully described, whereby the frames carrying the cultivator implements may be readily adjusted vertically with respect to the draft-frame, the devices connecting said draft-frame with the cultivator-frames being arranged to brace the draft-frame, and their disposition being such as to tend to preserve the perfect connection of the cultivator-frames with said draft-frame.

The invention further consists in certain connections auxiliary to those described, whereby the draft on the cultivator-frames is equalized and controlled.

In the accompanying drawings, Figure 1 is a plan view of a cultivator having my improvements embodied therein, and Fig. 2 is a side view of the same.

An axle, A, having centrally a vertical crank-shoulder, B, has turning on its ends the carrying-wheels C D.

Upon the top of the crank-shoulder B is rigidly secured the rear end of a draft-tongue, E. A transverse bar, F, is secured to the upper face of the draft-tongue E, parallel with the axle A, and has depending sections *a a*, each of which curves down and extends rearwardly in a horizontal line in the plane occupied by the horizontal portions *b b* of the axle A, each of the horizontal portions of the depending sections *a* being perforated for the passage of the axle.

At the base of each of the two vertical sections *c*, composing the sides of the crank-shoulder B, at a point where they intersect the horizontal portions *b* of the axle, is rigidly located a disk, *d*, which forms a bearing for the outer side of a curved or bow member, *e*, centrally perforated for the passage of the axle, and curved inward and secured rigidly to the depending section *a* of the bar F, its rear end being curved, so as to be in close proximity with the rear end of the depending section *a*, a perforation, *f*, in the rear portion of the said member *e* registering with a perforation in the rear depending section *a*. A second member, *g*, arranged on the outer side of each depending section *a*, curved in a direction opposite to the curve of the members *e*, is also connected rigidly to the depending sections *a*, is perforated for the passage of the axle, and has a perforation, *h*, in its rear end, which registers with the perforation of the depending section *a* and member *e*. A sleeve, *i*, on the horizontal portions of the axle, between the depending sections *a* and each of the curved members, maintains the said members in their curved position, and prevents their collapsing through any blow or shock.

Each cultivator-frame G is composed of a series of parallel bars, *j*, secured rigidly together by means of cross-braces *k*, standards *l* being provided for the attachment of the cultivator shovels or plows *m*, one of the standards located on the inner side of each frame being extended upward to form a handle, H, thus permitting one person to control both frames by the handles, which are arranged in close proximity for this purpose. One of the central bars of each frame G is extended at its forward end, *n*, which has integrally or otherwise formed therewith two vertically-elongated plates, *o p*, which have each a vertical series of perforations, *q*. The rear end of each depending section *a* is adapted to enter between said plates, so that its perforation registers with any desired perforation in the plates, while the rear ends of the members *e g* bear against the outer sides of said plates, the perforations of said members registering with the same perforation of the plates as the perforation of the depending section *a*. A bolt, I, passing through the registering perforations of the several parts, secures them together and effects the connection of the cultivator-frame with the draft-frame. A chain, J, secured on the axle near each of the disks d, connects with the inner side of each cultivator-frame by means of a hook, r, located on the front end of each inner beam of the cultivator-frames, which hook engages one of the links of the chain. Chains K K, each connected to the end of the axle A outside of the wheel C, are connected to the outer side of each cultivator-frame by having one of its links engage a hook, s, connected centrally on the outer side of each outer beam of each cultivator-frame.

From the foregoing description it will be apparent that a draft-frame constructed as described is both rigid and durable, that the arrangement of the depending sections of the bar F, in connection with curved members e g, serves to divide the draft-strain on the axle, while the curve form of the plate maintained intact by the washers on the axle tends to cause the rear portions of the said members e g to exert a spring clamping action on the sides of the perforated plates o p of the cultivator-frames, which have the ends of the depending sections between them to establish the necessary draft-connection.

The handles on the cultivator-frames being located on the inner sides of the same at the end thereof, the chains K K connect with the outer side of the cultivator-frames at points farther back than the connection of the chains J J at the inner sides thereof, this arrangement securing an equalization of the draft on the respective sides of the cultivator-frames in view of the location of the handles.

Having now described my invention, what I claim as new, and desire to secure by Letters Patent, is—

1. The combination, in a cultivator, of a draft-frame provided with depending sections extending rearwardly and adapted to enter between plates connected to the cultivator-frames, and curved members secured to the draft-frame and having their rear ends embracing the sides of the plates of the cultivator-frames, the said depending extensions, plates, and members being perforated for the passage of a retaining-bolt, substantially as set forth.

2. The combination, in a cultivator having a draft-frame provided with the depending sections and curved members, perforated as described, of cultivator-frames carrying plates o p, having a vertical series of perforations for the passage of a bolt, I, substantially as set forth.

3. The combination, in a cultivator, of a draft-frame supported by the carrying-wheels turning on the ends of the main axle, which is formed with a central shoulder to support the draft-tongue, to which is secured the bar F, having the extensions and members connecting with the cultivator-frames, one of said curved members bearing against a rigid disk secured on the axle, while the other bears against the hubs of the wheels, the curved form of the members being preserved by sleeves i on the axle, substantially as set forth.

4. The combination, in a cultivator, of cultivator-frames connected to a draft-frame, and provided with handles arranged at their inner sides, and connecting-chains J K, arranged as herein described.

In testimony whereof I affix my signature in presence of two witnesses.

MADISON MONROE WARMOTH.

Witnesses:
H. T. KENDALL,
E. A. COLEMAN.